United States Patent
Bares et al.

(10) Patent No.: US 9,028,678 B2
(45) Date of Patent: May 12, 2015

(54) SCRUBBING HYDROGEN SULFIDE FROM HYDROTREATED PRODUCT

(75) Inventors: Joe E. Bares, Bartlesville, OK (US); Devadas Panjala, Pearland, TX (US); Fred Clark, Bartlesville, OK (US); Brad E. Vanwinkle, Nowata, OK (US)

(73) Assignee: Phillips 66 Company, Houston, TX (US)

( * ) Notice: Subject to any disclaimer, the term of this patent is extended or adjusted under 35 U.S.C. 154(b) by 0 days.

(21) Appl. No.: 13/493,667

(22) Filed: Jun. 11, 2012

(65) Prior Publication Data

US 2013/0001135 A1 Jan. 3, 2013

Related U.S. Application Data

(60) Provisional application No. 61/502,154, filed on Jun. 28, 2011.

(51) Int. Cl.
*C10G 45/00* (2006.01)
*B01D 19/00* (2006.01)
*C10G 45/02* (2006.01)
*C10G 45/08* (2006.01)

(52) U.S. Cl.
CPC ............ *B01D 19/0015* (2013.01); *C10G 45/02* (2013.01); *C10G 45/08* (2013.01); *C10G 2300/202* (2013.01); *C10G 2300/4056* (2013.01)

(58) Field of Classification Search
CPC ......................................................... C10G 25/00
USPC ....................................................... 208/208 R
See application file for complete search history.

(56) References Cited

U.S. PATENT DOCUMENTS

| | | | | |
|---|---|---|---|---|
| 2,757,127 | A | * | 7/1956 | Porter et al. ................... 208/212 |
| 3,984,316 | A | | 10/1976 | Myers et al. |
| 4,097,585 | A | * | 6/1978 | Fischer ....................... 423/574.1 |
| 7,361,625 | B2 | | 4/2008 | Nakano et al. |
| 2012/0148479 | A1 | * | 6/2012 | Parekh et al. ............... 423/578.1 |

OTHER PUBLICATIONS www.sigmaaldrich.com/labware/glassware-catalog/distillation-packing.html (Apr. 29, 2009) 6 pages.*

* cited by examiner

*Primary Examiner* — Randy Boyer
*Assistant Examiner* — Juan Valencia
(74) *Attorney, Agent, or Firm* — Phillips 66 Company

(57) ABSTRACT

This application provides an $H_2S$ scrubbing system, a column packed with an inert material, wherein an inert gas passes counter to a flow of a hydrotreated product containing $H_2S$ through said column. There is also provided a method for scrubbing $H_2S$ from a hydrotreated product, comprising providing a hydrotreated product containing $H_2S$; and passing the hydrotreated product over a column packed with an inert material, wherein an inert gas passed counter to a flow of the hydrotreated product.

16 Claims, No Drawings

SCRUBBING HYDROGEN SULFIDE FROM HYDROTREATED PRODUCT

CROSS-REFERENCE TO RELATED APPLICATIONS

This application is a non-provisional application which claims the benefit of and priority to U.S. Provisional Application Ser. No. 61/502,154 filed Jun. 28, 2011, entitled "Scrubbing Hydrogen Sulfide from Hydrotreated Product," which is hereby incorporated by reference in its entirety.

STATEMENT REGARDING FEDERALLY SPONSORED RESEARCH OR DEVELOPMENT

None.

FIELD OF THE INVENTION

The invention relates to removal of unwanted gases from a product stream, in particular to scrubbing of dissolved hydrogen sulfide from hydrotreated product.

BACKGROUND OF THE INVENTION

When sulfur is removed from petroleum, hydrogen sulfide ($H_2S$) gas is often produced. This gas can oxidize to sulfur and ultimately to sulfur dioxide ($SO_2$). It is important to remove sulfur from petroleum products in order to reduce $SO_2$ emission during combustion in automotive vehicles, aircraft, locomotives, ships, gas or oil burning power plants, residential and industrial furnaces, etc., thus reducing negative environmental effects, such as acid rain. Sulfur is also removed from the naphtha streams within a petroleum refinery because, even in extremely low concentrations, sulfur poisons the noble metal catalysts (e.g., platinum and rhenium) that are used to upgrade the octane rating in the catalytic reforming units.

Of particular concern is the removal of $H_2S$ from hydrotreated products. If dissolved $H_2S$ is not removed from the hydrotreated product before the product is exposed to air, the product's sulfur content count increases due to oxidation of $H_2S$ to elemental sulfur. This interference prohibits the determination of accurate product sulfur values for ultra low sulfur diesel (ULSD) studies, where the target product sulfur is typically below about 10 ppm.

U.S. Pat. No. 3,984,316 describes a process for removing dissolved $H_2S$ from refinery waste water using a countercurrent stream of an absorber gas, which can comprise, among other things, nitrogen. U.S. '316 fails to describe treating a hydrotreated product and does not disclose packing a column with inert material, such as glass beads.

U.S. Pat. No. 7,361,625 addresses the photocatalytic removal of volatile organic compounds (VOCs) and unwanted gases from cracked olefin streams. U.S. Pat. No. 7,361,625 describes a process for the hydrodesulfurization of a cracked olefin stream wherein a mixture of $H_2$ and an inert gas, for example $N_2$, $CH_4$, $C_2H_6$, $C_3H_8$, $C_4H_{10}$, or noble gases (e.g., He, Ar), are mixed with the olefin stream. The mixture is heated and contacted with a desulfurization catalyst. As desulfurization occurs, the resulting $H_2S$ is removed using the $H_2$—$N_2$ gas stream.

Broderius and Smith ("Direct determination and calculation of aqueous hydrogen sulfide", Anal. Chem., 1977, 49 (3), pp 424-428) describe measuring the concentration of hydrogen sulfide in water. The aqueous $H_2S$ solution is sparged with nitrogen to displace the $H_2S$ gas. The displaced $H_2S$ gas is collected in a glass bed concentration column and measured colormetrically.

Sakanishi et al. ("Removal of Hydrogen Sulfide and Carbonyl Sulfide for Purification of Biomass Gasified Synthetic Gas Using Active Carbons", Prepr. Pap.-Am. Chem. Soc., Div. Fuel Chem., 2004, 49(2), 580) describe adsorption rates of $H_2S$ from a gas mixture consisting of $H_2S$ and $N_2$. Columns are packed with glass beads, and adsorptions are measured at variable temperatures.

Generally, dissolved $H_2S$ is scrubbed from petroleum products in situ with a caustic wash solution. Because $H_2S$ is considered a weak acid gas, its scrubbing calls for a strong alkali, such as NaOH, with caustic soda to accomplish in this method. This process, however, requires elaborate sample preparation, is very time-consuming, costly, exposes and endangers technicians to the risk of caustic solutions, and is impractical for denser and higher boiling point hydrocarbons.

What is needed in the art are better, more cost effective, and safer ways of removing H2S from refinery streams, and especially from hydrotreated products.

SUMMARY OF THE INVENTION

Safety and other problems are addressed by the $H_2S$ scrubbing system described herein, which comprises a column packed with glass beads or other inert support material; wherein nitrogen gas passes counter to a liquid flow through said column. The present in situ $H_2S$ scrubbing system is used without a caustic solution. Instead, an inert gas is used to scrub dissolved $H_2S$ from the hydrotreated product while limiting or completely eliminating exposure to air. The scrubbing system can be fitted to an existing system and is safer than prior systems, at least because it does not expose technicians to corrosive caustic solutions.

This application also provides a method for scrubbing $H_2S$ from a hydrotreated product, comprising providing a hydrotreated product containing $H_2S$, passing the hydrotreated product over a column packed with an inert material, such as beads or particles or any shape that provides surface area (like foam, monolith, cloth, fibers, etc.), wherein an inert gas (any gas that will not react either with feed or with product under scrubbing conditions) is passed counter to a flow of the hydrotreated product.

Current caustic wash procedures used on diesel products are impractical for hydrotreated gas oil products, which, unlike diesel products, are typically solid at room temperature. Thus, feed or products that are heavier than diesel hydrocarbons have to be heated to keep them in liquid phase.

The method provided herein can also be applied to gas oil products. This process also reduces the technician's involvement and, thereby, considerably reduces sample preparation time, reduces operating cost, improves technician safety, and enables operation at ultra low sulfur diesel or gas oil or fuel oil, which is not possible with current caustic wash systems or methods.

The inert gas can be selected from the group consisting of nitrogen, methane, ethane, propane, butane, helium, argon, krypton, xenon, carbon dioxide, carbon monoxide and hydrogen, and any combination thereof or any gas that will not react either with feed or with product under scrubbing conditions. The inert gas can be at a pressure of 0.1 atm to 10 atm, or 1.1 atm to 100 atm, and can be at a temperature of 10° C. to 500° C.

Generally, the gas is passed countercurrent to liquid flow and over a solid support material that is also inert. When in the form of particles or beads or any shape that will provide support and thus surface area, the inert material can have a $D_{50}$ of 1 mm to 10 nm, for example 100 μm to 1 μm, and can be porous or non-porous. The inert material can be any catalyst support that includes, but is not limited to, glass, silica, alumina, zirconia, aluminosilicates such as clays (e.g., montomorillonite, kaoline), metals, alloys, and the like, and combinations thereof or any material that will not react either with feed or products under scrubbing conditions. The inert material can be any shape or any form that can provide a surface, such as particles, beads, foams, monoliths, wheels, wagons, pellets, granules, extrudates, fibers, cloths, and the like, and combinations thereof or any shape that will provide sufficient surface area.

In particular, this invention provides a $H_2S$ scrubbing system, comprising a reservoir; and a column packed with glass beads, wherein the column is downstream from the reservoir, and wherein nitrogen gas passes counter to a flow of a hydrotreated product containing $H_2S$ at a temperature above room temperature.

This invention also provides a method for scrubbing $H_2S$ from a hydrotreated product, comprising providing a hydrotreated product containing $H_2S$; and passing the hydrotreated product over a column packed with an inert material, wherein an inert gas passed counter to a flow of the hydrotreated product.

The scrubbing columns of the invention can be retrofitted into existing plant configurations with minimal difficulty, and thus can be combined with various processes and still provide the safety and cost advantages on the invention.

DESCRIPTION OF EMBODIMENTS OF THE INVENTION

The following abbreviations are used herein:

| | |
|---|---|
| DSI | Dry sorbent injectors |
| HDS | Hydrodesulfurization |
| PSD | Particle size distribution |
| SDA | Spray dryer absorbers |
| ULSD | Ultralow sulfur diesel |
| VOC | Volatile organic compound |

"Absorber gas" or "fuel gas" refers to a gas comprising primarily uncondensible overhead gas derived primarily from catalytic cracking, along with gas from other refinery processing units such as crude oil topping units, reformers, and hydrotreaters. For example, this gas can include methane, ethane, ethylene, and relatively small amounts of propane and propylene. Other constituents can include hydrogen, nitrogen, carbon dioxide, carbon monoxide, and ammonia. Absorber gas is used for removing unwanted gases for a product stream.

"Average particle size" or "average equivalent diameter" refers to the diameter where 50 mass % of particles in a powder have a larger equivalent diameter, and the other 50 mass % have a smaller equivalent diameter. For example, average particle size can be denoted as equivalent $D_{50}$, which can be read from the cumulative particle size distribution (PSD) graph. From the point where the 50% horizontal line intersects the PSD curve, a line can be drawn perpendicular to the x-axis. The numerical value of $D_{50}$ can be read (or interpolated) at the point of intersection perpendicular to the x-axis. $D_{10}$ refers to an equivalent diameter where 10 mass % of the particles in a powder have a smaller diameter, hence the remaining 90 mass % are coarser (i.e., have a larger diameter). $D_{90}$ refers to an equivalent diameter where 90 mass % of particles in a powder have a smaller diameter and only 10 mass % are coarser.

"Column" refers to a hollow tube, cylinder, or the like used for separations, such as chromatographic or affinity separations. A column can be packed, for example, with beads, such as glass beads. A column can have a length suitable for the separation method it is used in, for example a length of 10 m to 10 cm, 100 cm to 25 cm, or 50 cm to 30 cm. A column can have a diameter similarly selected for its suitability in its targeted application, for example a diameter of 1 m to 1 mm, 50 cm to 10 cm or 10 cm to 1 cm. The column diameter can be measured as the external diameter (from the outer wall of one side to the outer wall of the other side) or as the internal diameter (the distance between the inter walls).

"Hydrotreated product" refers to a material which has been reacted with hydrogen to remove impurities, especially as part of chemical engineering process such as oil refinement. Typically hydrotreating is a refinery process to remove sulfur and nitrogen from crude oil and other feedstocks, often in conjunction with a catalyst at greater than normal temperature and pressure. Examples of hydrotreating include hydrodesulfurization.

"Hydrodesulfurization" (HDS) refers to a catalytic chemical process to remove sulfur from natural gas and refined petroleum products, such as gasoline (petrol), jet fuel, kerosene, diesel fuel, and fuel oils. Sulfur-containing organics are catalytically hydrogenated to remove sulfur and generate $H_2S$ as a byproduct. Industrial hydrodesulfurization captures and removes the resulting $H_2S$, typically converting it into elemental sulfur or sulfuric acid. Most HDS catalysts are based sulfides, such as $MoS_2$, with or without a small amount of other metals. HDS catalysts can also comprise an alumina base impregnated with cobalt and molybdenum (CoMo), a combination of nickel and molybdenum (NiMo) with CoMo or a combination of nickel, cobalt and molybdenum (CoNiMo). This latter combination catalysts are especially useful for stocks with a high level of chemically bound nitrogen.

In an industrial hydrodesulfurization process, liquid feed is pressurized and combined with hydrogen-rich recycle gas. This liquid-gas mixture is preheated in a heat exchanger, is flowed through a heater where the feed is heated to the required temperature, and is then flowed through a fixed-bed of catalyst. Hydrodesulfurization reaction can occur in a fixed-bed reactor at temperatures from about 300° C. to about 400° C., and at pressures from about 30 to about 130 atmospheres (atm). Reaction products are cooled and depressurized before entering a gas separator vessel at about 35° C. and about 3 to about 5 atm.

"Inert", as used throughout this specification, refers to a substance, such as a solid, liquid, gas or material, that has limited chemical reactivity under the conditions it is used, for example under scrubbing conditions. That is, an inert substance, such as an inert gas or inert material, does not substantially cause a chemical reaction to occur, although physical processes, such a sorption, for example adsorption, desorption, and adsorption, changes in concentration or solubility, go otherwise unhindered.

"Inert gas" refers to a gas that substantially does not react with the system to which it is exposed. For example, Group VIII gases (noble gases) are inert because they form very few stable compounds with other atoms and can protect molecules from exposure to more active species, for example oxygen. The inert gas in this application can be selected from the group consisting of nitrogen, methane, ethane, propane, butane, helium, argon, krypton, xenon, carbon monoxide, carbon dioxide ($CO_2$), hydrogen ($H_2$), fuel gas, and any combination thereof, or any gas that will not react either with feed or with product under scrubbing conditions. Inert gas can be at a pressure of 1 atm to 1.5 atm, 0.1 atm to 10 atm, 1.1 atm to 100 atm, 2 atm to 50 atm, or 10 atm to 25 atm. Inert gas can be at a temperature of 10° C. to 500° C., 50° C. to 400° C., or 100° C. to 300° C.

"Inert material" refers to any material that is substantially non-reactive under reaction conditions and can provide a surface of adsorption, absorption, and/or support of another material, for example, of a catalyst. The inert material can comprise, for example, any inert catalyst support, such as glass, silica ($SiO_2$), titania ($TiO_2$), alumina, zirconia, aluminosilicates such as clays (e.g., montomorillonite, kaoline), inert metals, inert alloys, and the like, and combinations thereof, or any material that will not react with either the product or feed under scrubbing conditions. An inert material can also be coated with carbon and/or a metal oxide, for example ZnO and $Fe_2O_3$, to enhance $H_2S$ adsorption or separating ability. At scrubber conditions, metals and alloys are passivated with sulfur compounds and become metal sulfides.

The inert material can be any shape or any form that include not limited to particles, beads, foams, monoliths, wheels, wagons, pellets, granules, extrudates, fibers, cloths, and the like, and combinations thereof, or any material that provides a sufficient surface area. "Bead" refers to small ball, pellet, sphere, spherule or spheroid comprising an inert solid material. The inert material can be in the form of particles or beads with a $D_{50}$ of 10 mm to 10 nm, for example 100 μm to 1 μm, and can be porous or non-porous. In particular, the inert material can be glass beads.

"Mercaptan" refers to a compound comprising carbon, hydrogen and sulfur, for example found in sour crude and sour gas. Lower mercaptans have a strong, repulsive odor and are used, among other things, to odorize natural gas.

"Scrubber" refers to a system which removes unwanted chemicals, including, for example, sulfur and sulfur-containing gases, from industrial exhaust streams and product streams, benefiting air pollution control. Wet scrubbers use liquid to wash unwanted pollutants from a gas stream. Dry scrubbers refer to systems that inject a dry reagent or slurry into a dirty exhaust stream to wash out acid gases, such as $CO_2$, $SO_2$ and hydrochloric acid (HCl). Scrubbers are a primary means to control gaseous emissions, especially acid gases, and can recover heat from hot gases by flue gas condensation.

A wet scrubber can clean air, flue gas or other gases of various pollutants and dust particles. Wet scrubbing works by contact of target compounds or particulate matter with a scrubbing solution, comprising, for example, water or reagents that specifically target certain compounds. Removal efficiency of pollutants is improved by increasing residence time in the scrubber or by increasing surface area of the scrubber solution using a spray nozzle, packed towers, or an aspirator.

A dry or semi-dry scrubbing system, unlike a wet scrubber, does not saturate the flue gas stream with moisture. In some cases no moisture is added, while in other cases only the amount of moisture that can be evaporated in the flue gas without condensing is added. Therefore, dry scrubbers generally do not have a stack steam plume or wastewater handling or disposal requirements. Dry scrubbing systems can also remove acid gases, especially from combustion sources.

Most dry scrubbing system designs consist of a device to introduce the acid gas sorbent material into the gas stream, and a particulate matter control device to remove reaction products, excess sorbent material, or particulate matter from the flue gas. Media in dry scrubbing systems can comprise activated alumina impregnated with materials to handle specific gases and odorous compounds, such as methyl mercaptans, aldehydes, VOCs, dimethyl sulfide, and dimethyl disulfide. Dry scrubbing systems include dry sorbent injectors (DSI), and spray dryer absorbers (SDA), which are also called semi-dry scrubbers or spray dryers.

"Sour gas" refers to a gas containing a significant amount of $H_2S$. Natural gas is usually considered sour if there are more than 5.7 milligrams of $H_2S$ per cubic meter ($m^{-3}$) of natural gas, which is equivalent to approximately 4 ppm by volume. On the other hand, natural gas that does not contain significant amounts of hydrogen sulfide is called "sweet gas," and the process of removing mercaptans and other sulfur-containing compounds is referred to as "sweetening".

The present invention is exemplified with respect to hydrogen sulfide scrubbers for treatment of hydrotreated product. However, this system and method are exemplary only, and the invention can be broadly applied to scrubbing $H_2S$ from any hydrocarbon fuel. The following examples are intended to be illustrative only, and not unduly limit the scope of the appended claims.

EXAMPLE 1

A portion of $H_2S$-containing hydrotreated product derived from a refinery product stream is placed in a reservoir. The hydrotreated product is flowed through a column packed with glass beads downstream from the reservoir. Nitrogen gas is flowed counter to the flow of hydrotreated product at a pressure and temperature sufficient to remove or undissolve $H_2S$ gas in the hydrotreated product. The glass beads used in this example are non-porous and have a $D_{50}=1$ mm.

Because the use of glass beads in a column, the time allowed for adsorption of inert gas and scrubbing of $H_2S$ from the oil-gas product is prolonged, and the total effective scrubbing surface through which scrubbing takes place is also expanded, which allows more complete scrubbing of $H_2S$ from the product.

The countercurrent design of the present invention allows the gas-oil product to be scrubbed having highest $H_2S$ concentration to encounter the nitrogen gas, such that the displacement of $H_2S$ from the gas-oil product can occur at a place where the nitrogen concentration is the highest. It is expected that other inert gases, such as methane, ethane, propane, butane, helium, argon, krypton, xenon, carbon monoxide carbon dioxide, fuel gas, hydrogen or the like or any gas that will not react either with feed or with product under scrubbing conditions, can also have similar scrubbing capability as nitrogen because they can be readily adsorbed by the gas-oil product to displace $H_2S$ without significant chemical reactions taking place under scrubber conditions.

In this example, the initial $H_2S$ concentration in the hydrotreated oil-gas product is approximately 30 ppm. The estimated scrubbing provided by the present invention is to reduce the $H_2S$ concentration within the gas-oil product to 20 ppm, preferably 10 ppm or less, comparable to a conventional scrubbing method with much less energy consumption, operational cost and personnel involvement.

The $H_2S$ containing inert gas can be treated to collect and remove the $H_2S$ in a known manner, for example, by converting to raw sulphur via the Claus process, or water scrubbing to make sulphuric acid, or solid scavenging, e.g., with activated carbon or limestone, and the like. In an alternative method, the loaded gas can be treated biologically, e.g., with *thiobacillus* organisms.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The following references are incorporated by reference in their entirety:

U.S. Pat. No. 3,984,316;

U.S. Pat. No. 7,361,625;

Broderius and Smith, "Direct determination and calculation of aqueous hydrogen sulfide", *Anal. Chem.*, 1977, 49 (3), pp 424-428;

Sakanishi et al., "Removal of Hydrogen Sulfide and Carbonyl Sulfide for Purification of Biomass Gasified Synthetic Gas Using Active Carbons", *Prepr. Pap.-Am. Chem. Soc., Div. Fuel Chem.*, 2004, 49 (2), 580.

The invention claimed is:

1. A method for reducing H2S in a hydrotreated petroleum product, comprising providing a liquid hydrotreated petroleum product containing H2S; passing said liquid hydrotreated petroleum product over a column packed with an inert material; passing an inert gas countercurrent to a flow of the liquid hydrotreated petroleum product in said column, so as to absorb H2S from said liquid hydrotreated petroleum product, wherein the inert gas is at a pressure of 2 atm to 50 atm and temperature of greater than 100° C. up to about 500° C.

2. The method of claim 1, wherein the inert material is in the form of beads.

3. The method of claim 2, wherein the beads have a D50 of 2 mm to 10 nm.

4. The method of claim 2, wherein the beads have a D50 of 1 mm to 1 µm.

5. The method of claim 1, wherein the inert gas is selected from the group consisting of nitrogen, methane, ethane, propane, butane, helium, argon, krypton, xenon, carbon monoxide, carbon dioxide, hydrogen, fuel gas and any combination thereof.

6. The method claim 1, wherein the inert material is selected from the group consisting of glass, silica, titania, alumina, zirconia, aluminosilicates, clays, metals, alloys and combinations thereof.

7. The method of claim 1, wherein the inert material is in the form of one or more selected from the group consisting of particles, beads, foams, monoliths, wheels, wagons, pellets, granules, extrudates, fibers, and cloths.

8. The method of claim 1, wherein the inert material is glass beads and the inert gas is nitrogen gas.

9. A method for reducing H2S in a hydrotreated petroleum product, comprising providing a liquid hydrotreated petroleum product containing H2S; passing said liquid hydrotreated petroleum product over a column packed with an inert material; passing an inert gas countercurrent to a flow of the liquid hydrotreated petroleum product in said column, so as to absorb H2S from said liquid hydrotreated petroleum product, wherein the inert gas is delivered to the column at a temperature of greater than 100° C. up to about 500° C.

10. The method of claim 9, wherein the inert gas is selected from the group consisting of nitrogen, methane, ethane, propane, butane, helium, argon, krypton, xenon, carbon monoxide, carbon dioxide, hydrogen, fuel gas and any combination thereof.

11. The method claim 9, wherein the inert material is selected from the group consisting of glass, silica, titania, alumina, zirconia, aluminosilicates, clays, metals, alloys and combinations thereof.

12. The method of claim 9, wherein the inert material is in the form of one or more selected from the group consisting of particles, beads, foams, monoliths, wheels, wagons, pellets, granules, extrudates, fibers, and cloths.

13. The method of claim 9, wherein the inert material is glass beads and the inert gas is nitrogen gas.

14. The method of claim 9, wherein the inert material is in the form of beads.

15. The method of claim 14, wherein the beads have a D50 of 2 mm to 10 nm.

16. The method of claim 14, wherein the beads have a D50 of 1 mm to 1 µm.

* * * * *